United States Patent [19]

Wehunt

[11] 4,154,400
[45] May 15, 1979

[54] DETENT MECHANISM FOR WAND-TYPE SPRAY GUN

[76] Inventor: Omer L. Wehunt, 3238 Pinchot, Phoenix, Ariz. 85018

[21] Appl. No.: 883,533

[22] Filed: Mar. 6, 1978

[51] Int. Cl.² .............................................. B05B 15/06
[52] U.S. Cl. .................................... 239/282; 222/530; 239/288.5
[58] Field of Search ...................... 239/282, 288.5, 289, 239/311; 222/530, 538; 248/410; 224/2 B, 2 C, 2 D, 5 R, 5 A, 26 R, 26 B

[56] References Cited

U.S. PATENT DOCUMENTS

| | | | |
|---|---|---|---|
| 2,640,724 | 6/1953 | Sanders et al. | 239/311 |
| 3,372,875 | 3/1968 | Torrey | 239/289 |
| 3,500,881 | 3/1970 | Salmans | 222/530 |
| 3,946,947 | 3/1976 | Schneider | 239/311 |
| 4,098,437 | 7/1978 | Reinke | 222/530 |

Primary Examiner—Robert W. Saifer
Assistant Examiner—Michael J. Forman
Attorney, Agent, or Firm—Dean and Flickinger

[57] ABSTRACT

A collar, slidably carried upon the barrel of a wand-type spray gun, is normally urged rearward against a stop by a compression spring. Disposed between the stop and the collar is a ring-like member which rocks relative the barrel using the edge of the collar as a fulcrum. The ring-like member abuts a lip extending radially inward from the forward end of a holder tube and prevents expulsion of the spray gun in response to the rearward force from the emission of high pressure fluid from the nozzle of the spray gun. Slight pressure upon the handle readily withdraws the spray gun from the holder and tapered fins carried by the collar. A ramp depending from the lip guides the spray gun into the holder.

10 Claims, 7 Drawing Figures

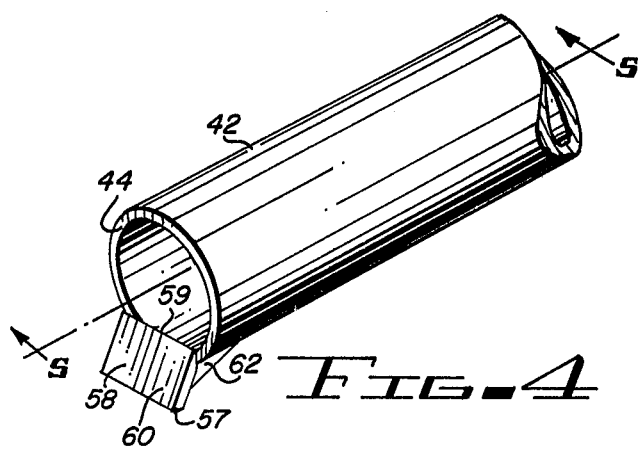
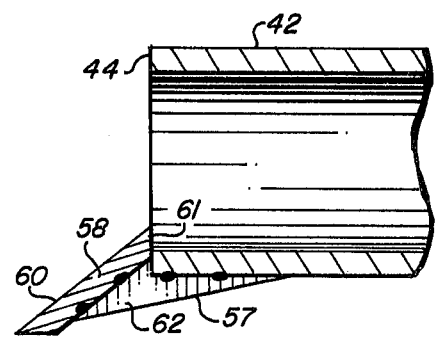
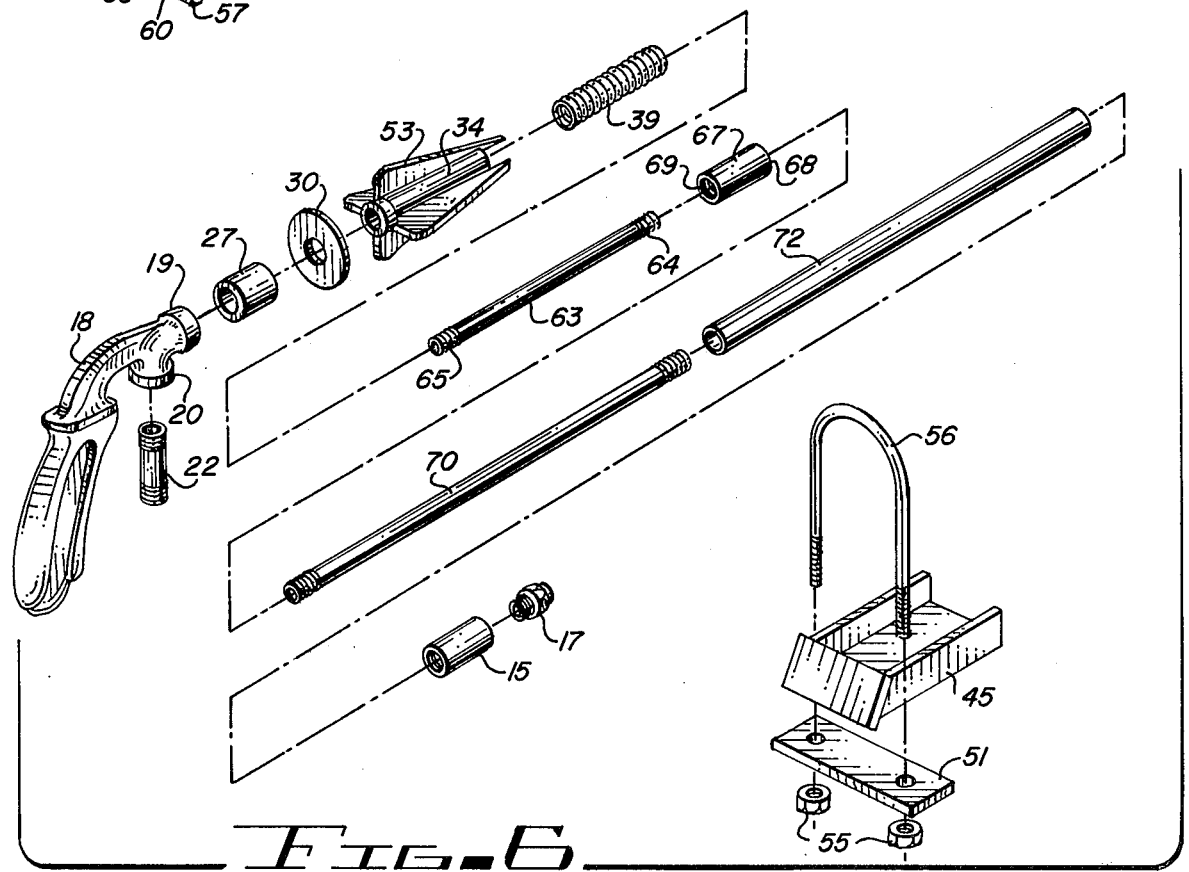
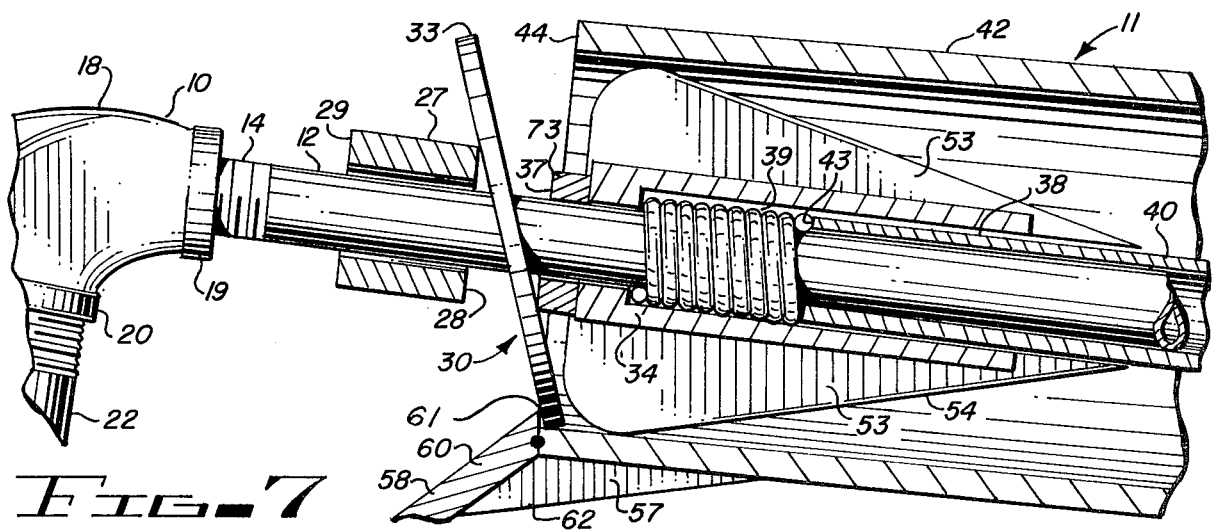

DETENT MECHANISM FOR WAND-TYPE SPRAY GUN

This invention relates to wand-type spray guns.

In a further aspect, the present invention relates to spray guns for dispensing pressurized fluid and normally held in a tubular holder when not in use.

More particularly, the instant invention concerns improved detent means for retaining the spray gun in the holder against the force generated by the pressurized fluid emitted from the nozzle.

Wand-type spray guns of the character of the instant concern are generally well known. Briefly, such devices include an elongate barrel having a nozzle at the forward end and a hand grip at the rearward end. a fluid inlet, usually in the form of a hose coupling is also located proximate the rearward end of the barrel. The spray gun ordinarily resides in a tubular holder when not in use.

Spray guns of the foregoing type are commonly used to dispense cleaning fluids and solutions. In this regard, specific utility is had in connection with vehicle cleansing facilities. Such facilities, which generally represent commercial endeavors, are usually either full service automated centers or self-service manually operable stations.

Typically, the self-service facility includes a structure having a concrete pad of sufficient size to receive a vehicle. A pair of opposed walls extend along longitudinal edges of the pad and support a roof to define a shelter having open lateral ends. Several similar structures, each referred to as a stall, are usually erected adjacently to simultaneously accommodate several users.

Located in each stall is a wand-type spray gun. The holder is usually secured flush to a wall with the forward end depending downwardly at approximately a 30° to 40° angle. Adjacent the holder is a coin operable switch. Situated at a remote position, such as a centrally located utility room, is the supply unit which includes a detergent tank, a water heater and a pump.

After the user deposits a coin into the switch receptacle, fluid is supplied to the selected spray gun from the supply unit through a system of rigid conduits and hose. The user can select detergent water for washing or plain water for rinsing. Since a length of flexible hose communicates directly with the hose coupling, the user may withdraw the spray gun from the holder and move about during the cleansing operation. Spent fluid is carried away by a drain situated within the pad.

Fluid is discharged from the spray gun at relatively high pressure which may exceed 500 pounds per square inch. The sudden surge of pressure from the nozzle exerts substantial rearward force upon the spray gun. The force is sufficient to dislodge the spray gun from the holder. Once free from the holder, the spray gun, secured to the hose at one end and high pressure fluid jetting from the other end, commences violent gyrations, whipping and thrashing about.

The surge of pressure from the spray gun is almost immediate upon the deposit of a coin into the switch mechanism. Preoccupied with placing the coin into a slot and selecting the desired fluid, the unsuspecting user may not as yet have grasped the handle of the spray gun. The sudden expulsion of the spray gun represents a serious safety hazard to the face, head and upper torso of the user. The subsequent thrashing about is potentially dangerous to the lower torso. Should the user escape injury, the possibility of being drenched is nearly unavoidable.

Accordingly, it is an object of the instant invention to provide an improved wand-type spray gun and holder therefor.

Another object of the invention is the provision of a detent mechanism for releasably retaining a spray gun within a holder.

And, another object of the invention is to provide a detent mechanism for retaining a wand-type spray gun in a holder against the force of a high pressure jet from the nozzle.

Yet another object of the invention is the provision of detent means which are readily releasable in response to normal manual urging upon the hand grip of the spray gun.

Still another object of the present invention is to provide a detent mechanism which is adapted to be installed on pre-existing spray gun apparatus.

And, a further object of the invention is the provision of detent means which can be attached to spray gun apparatus without the need for special tools or skills.

Still a further object of the invention is to provide a detent mechanism including guide means for directing a spray gun into a holder.

Yet a further object of the invention is the provision of a detent mechanism which is unobtrusive and will not interfere with the primary function of the spray gun.

And still a further object of this invention is to provide a detent mechanism which will automatically engage and disengage without deliberate action by the user.

And yet a still further object of the invention is the provision of a detent mechanism of the above type which is exceedingly positive and durable yet relatively simple and inexpensive to manufacture.

Briefly, to achieve the desired objects of the instant invention in accordance with a preferred embodiment thereof, first provided is a collar, which is slidably disposed upon the barrel of a wand-type spray gun nearer the rearward end thereof than the forward end. Biasing means, such as a coil spring, normally urges the collar rearwardly against a stop such as an annular shoulder. A ring-like member encircles the barrel intermediate the stop and the collar and is capable of a rocking movement relative the barrel, using the edge of the collar as a fulcrum. A lip extends radially inward at the rearward end of the tubular holder. The lip engages the ring-like member to check rearward movement of the spray gun in response to the emission of pressurized fluid from the spray nozzle at the forward end of the barrel. Additional force, directed slightly upward, upon the handle at the rearward end of the spray gun readily withdraws the spray gun from the holder.

In accordance with a further embodiment, a ramp depends downwardly rearward from the lip of the holder. Circumferentially spaced fins extend radially from the collar. Each fin is tapered from a forward position near the barrel to a rearward position extending beyond the circumference of the ring-like member. The ramp cooperates with the fins to provide guide means for directing the spray gun into the holder in response to forwardly directed pressure exerted upon the handle of the spray gun by the user.

The foregoing and further and more specific objects and advantages of the instant invention will become readily apparent to those skilled in the art from the following detailed description of preferred embodiments thereof, taken in conjunction with the drawings, in which:

FIG. 4 is a partial perspective view of an alternate embodiment of a holder useful in connection with the instant invention;

FIG. 5 is a vertical sectional view taken along the line 5—5 of FIG. 4;

Figure 2:
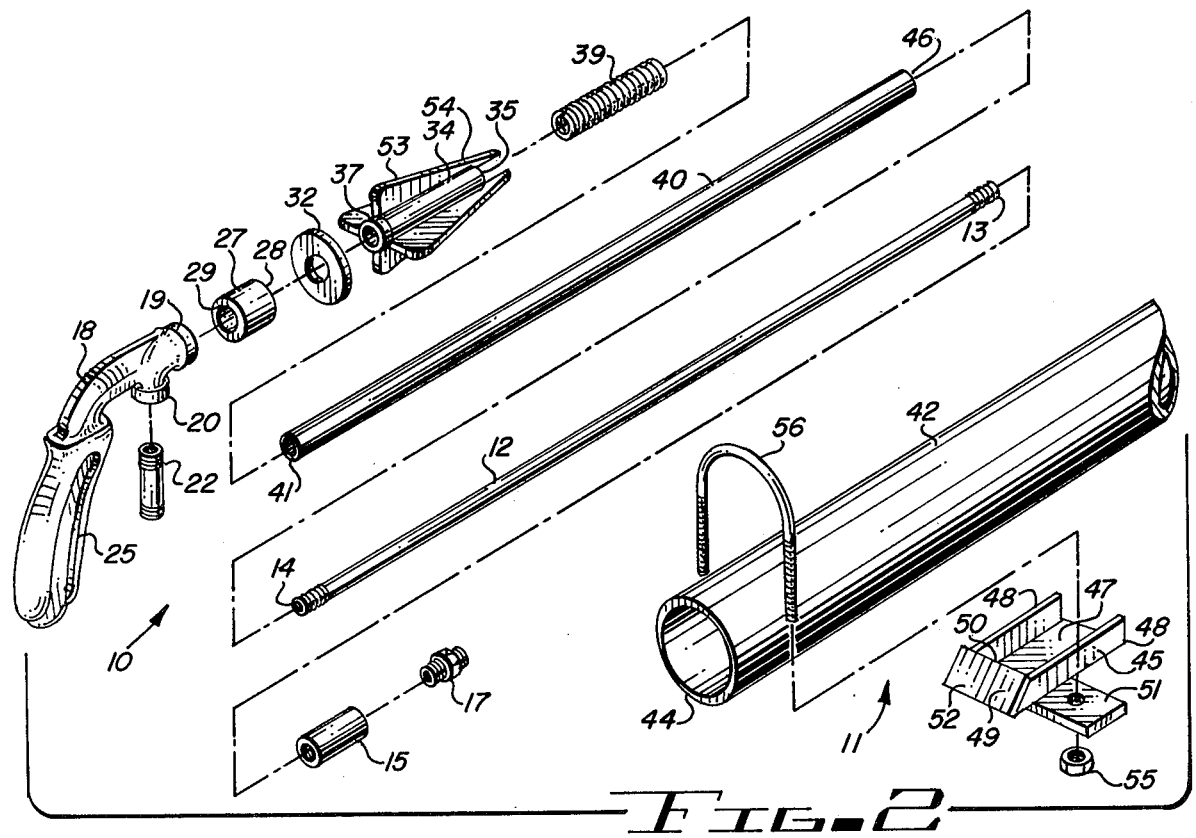
FIG. 2 is an exploded perspective view of the device of FIG. 1.

FIG. 6 is an exploded perspective view of an alternate embodiment of the instant invention especially adapted as a kit for use in connection with pre-existing spray guns; and FIG. 7 is an enlarged view corresponding to the illustration of FIG. 5 and also showing in vertical section a fragmentary portion of the spray gun of FIG. 2 and particularly illustrating the interaction between the spray gun and the holder during a time when rearward pressure is being exerted upon the spray gun.

Figure 1:
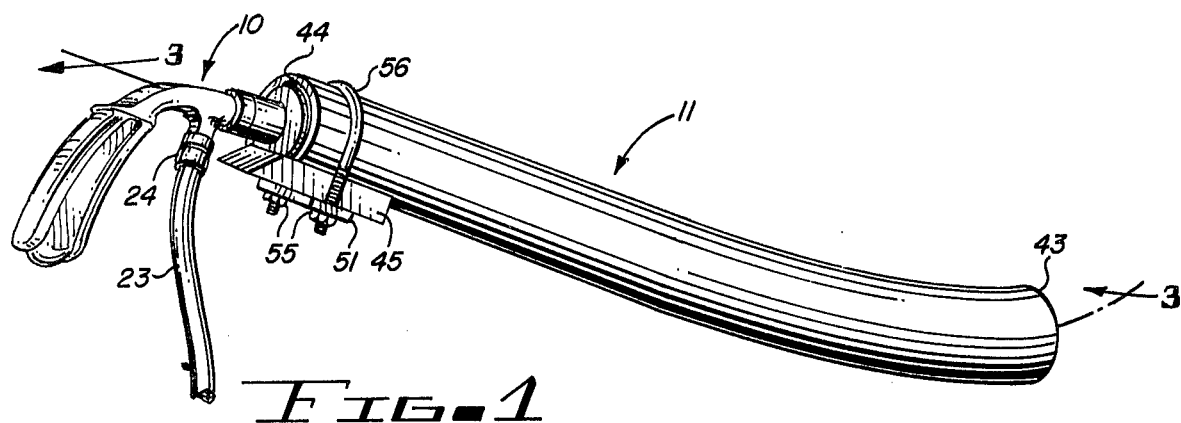
FIG. 1 is a perspective view of a spray gun assembly and holder embodying the principles of the instant invention.

Turning now to the drawings, in which like reference characters indicate corresponding elements throughout the several views, attention is first directed to FIGS. 1 and 2 which show a spray gun, generally designated by the reference character 10, and a holder therefor, generally designated by the reference character 11, each being constructed in accordance with teachings of the instant invention. Spray gun 10 is of the wand-type commonly used for dispensing high pressure fluids, especially water and cleansing solutions. Spray gun 10 includes an elongate barrel 12, having forward end 13 and rearward end 14. Each end 13 and 14 is provided with a conventional male pipe thread. Pipe coupling 15 is securable to forward end 13 and provides the union between barrel 12 and spray nozzle 17. Handle element 18 has rearwardly directed connection port 19 and downwardly directed connection port 20. Each connection port 19 and 20 is provided with a conventional male pipe thread. Connection port 19 receives rearward end 14 of barrel 12 and downward connection port 20 receives pipe nipple 22. Hose 23 is secured to nipple 22 by hose clamp 24. Handle element 18 further includes hand grip portion 25.

The foregoing described elements of spray gun 10 are generally conventional components of commercially available spray guns of the instant type. Barrel 12 is fabricated from one quarter inch galvanized pipe and functions as a fluid delivery conduit. Handle element 18 is likewise fabricated of galvanized iron and hand grip portion 25 is encased in plastic. Hose 23 communicates with a source of high pressure fluid. In connection with a car washing facility, the source of high pressure fluid includes a water heater, a cleansing solution tank and a pump. Intermediate the hose and the source of fluid resides conventional coin operated switching mechanism for supplying fluid to hose 23, and for selecting of cleansing fluid or rinse water.

The foregoing is intended to be generally representative of commerically available spray guns and fluid delivery systems. Exact configuration of such devices is variable among manufacturers. For example, a similar type of spray gun does not include downward connection port 20 integral with handle element 18. Equivalent function is provided by a pipe T having one leg thereof engaged within forward connection port 19. The other two legs of the T receive the barrel and the hose. The instant invention is adaptable for use with the various types.

Figure 3:
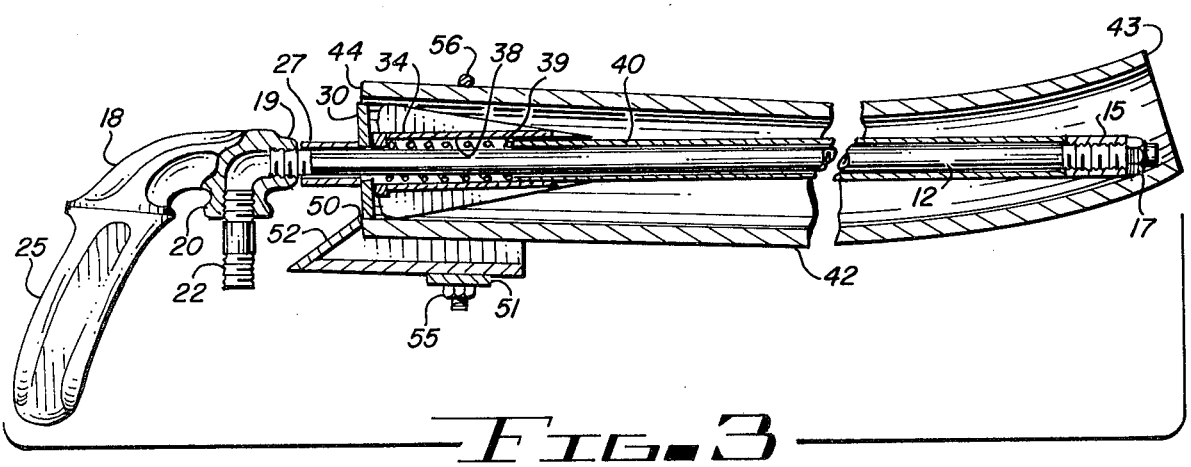
FIG. 3 is a vertical sectional view taken along the line 3—3 of FIG. 1, the view having an intermediate section broken away.

In accordance with the instant invention, sleeve 27, having forward end 28 and rearward end 29, is slidably disposed upon barrel 12. Rearward end 29 abuts forward connection port 19 of handle element 18 which limits the rearward movement of sleeve 27, as is also seen in FIG. 3. Ring-like member 30, having outer circumferential edge 32, is carried upon barrel 12 in juxtaposition with sleeve 27. Aperture 33 through ring-like member 30 is sized such that ring-like member 30 can have a rocking movement relative barrel 12. Normally, the longitudinal axis of ring-like member 30 and the longitudinal axis of barrel 12 are coincident. Rocking motion is defined herein as the movement of ring-like member 30 such that the longitudinal axis thereof is angularly displaced relative the longitudinal axis of barrel 12.

Collar 34, having forward end 35 and rearward end 37, is also slidably disposed upon barrel 12. Counterbore 38, extending inwardly from forward end 35, receives coiled compression spring 39. Tubular member 40, having forward end 46 and rearward end 41, as might be fabricated from conventional one-half inch conduit, encases barrel 12. The abutment of forward end 46 against pipe coupling 15 retains tubular member 40 upon barrel 12 and limits the forward movement of tubular member 40. In the normal position, spring 39 exerts pressure upon rearward end 41 of tubular member 40 ad upon collar 34, urging rearward end 37 against ring-like member 30, which in turn is abutted against forward end 28 of sleeve 27, the rearward end 29 of which rests against connection port 19 of handle element 18. It is noted that rearward end 41 of tubular member 40 also resides within counterbore 38.

Commonly, a holder for a wand-type spray gun is fabricated of two-inch galvanized pipe and secured to a convenient wall by any conventional means with the forward end thereof sloping downwardly approximately 30° to 40°. Holder 11 of the instant invention may be similarly fabricated to provide an elongate tube 42, having forward end 43 and rearward end 44. It is anticipated that holder 11 will be mounted in accordance with conventional practice. Bracket 45 of the instant invention is secured to tube 42 proximate rearward end 44. Bracket 45 includes bottom plate 47, having longitudinally extending side plates 48. Bracket 45 further includes angularly disposed end plate 49. Side plates 48 abut tube 42 along parallel longitudinal lines and the attachment is made by U-bolt 56, which extends through strap 51 on the underside of bracket 45 and is engaged with nuts 55. In the assembled position, edge 50 of end plate 49 forms a lip extending radially inward from rewarward end 44 of tube 42. Face surface 52 of plate 49 provides a ramp which extends downwardly rearward from the lip provided by edge 50.

Ring-like member 30 is sized to be received within tube 42. Longitudinal fins 53 extend radially from collar 34. Each fin 53 is generally triangularly shaped, having an outer edge 54 which diverges from collar 34 in a rewarward direction. Fins 53 cooperate with end plate 49 for guiding spray gun 10 into holder 11. As spray gun 10 is inserted into holder 11, edge 54 will slide over surface 52 and therefore guide ring-like member 30 into end 44 of tube 42. Once spray gun 10 is within holder 11, ring-like member 30 proximate edge 32 thereof will abut the lip formed by edge 50 of bracket 45 and retain spray gun 10 within holder 11 when spray gun 10 is urged in a rearward direction in response to high pressure fluid jetting from nozzle 17. Spring 39 will dampen the initial surge of fluid from nozzle 17. Manual extraction of spray gun 10 from holder 11 will be described presently.

In the normal rest position of a conventional spray gun and holder, the nozzle will fall to rest against the lowest portion of the inner wall of the holder. It has been observed that the first reaction of a conventional spray gun to the emission of high pressure fluid from the spray nozzle is the raising of the spray nozzle against the upper portion of the interior wall of the holder. This movement can be retarded and the strain removed from the foregoing described detent mechanism by inducing a bend into tube 42. The bend, as particularly seen in FIGS. 1 and 3, involves the terminal portion of tube 42 at forward end 43. The bend is in a upwardly direction such that the lower portion of the sidewall of tube 42 lifts nozzle 17, positioning barrel 12 closely to the upper portion of the wall of tube 42. It is readily observed in FIG. 3 that slight upward movement of nozzle 17 will result in barrel 12 striking holder 11.

FIGS. 4 and 5 illustrate an alternate bracket 57 useful with holder 11 and providing the same function as bracket 45. Bracket 57 includes end plate 58, having edge 59 and face surface 60. Edge 59 extends radially inward from rearward end 44 of tube 42 to provide lip 61 for retaining ring-like member 30 as previously described. Similarly, face surface 60 provides a ramp for cooperating with fins 53 and guiding ring-like member 33 into tube 42. The immediate embodiment is in the form of a weldment and is reinforced by gussets 62.

Spray gun 10 is particularly adapted as an article of new manufacture. In this regard it is intended that spray gun 10 be supplied with a holder such as tube 42, having bracket 57 permanently secured thereto. FIG. 6 illustrates a detent mechanism embodying the principles of the instant invention which is particularly adapted for modification of pre-existing apparatus. The particular advantage of the embodiment of FIG. 6 is the compact size and light weight, which are shipping and handling considerations.

The conventional wand-type spray gun, as previously described, includes handle element 18, pipe nipple 22, pipe coupling 15 and spray nozzle 17. The kit of the instant invention includes sleeve 27, ring-like member 30, collar 34 with fins 53 and compression spring 39, as previously described. Also included in the kit is a barrel segment 63, having forward end 64 and rearward end 65 and pipe coupling 67, having forward end 68 and rearward end 69. Barrel segment 63 is fabricated from appropriately sized galvanized pipe such that rearward end 65 thereof can be threadedly engaged with forward connection port 19 of handle element 18. Coupling 67 is engaged with forward end 64 of barrel segment 63. In the assembled configuration, sleeve 27, ring-like member 30, collar 34 and compression spring 39 are carried upon barrel segment 63 in an arrangement as illustrated in FIG. 3. Compression spring 39 bears against rearward end 69 of coupling 67 to urge collar 34, ring-like member 30 and sleeve 27 rearwardly, also as previously described.

In preparation for attachment of the kit of the instant invention, the pre-existing barrel 70 is removed from connection port 19 and shortened by a distance corresponding to the combined length of barrel segment 63 and pipe coupling 67. The combination of barrel segment 63, coupling 67 and shortened barrel 70 have a combined total length equaling the original length of barrel 70. Spray guns of the type under immediate consideration are frequently supplied by manufacturers with a sheath of tubular member 72 encasing the barrel. Accordingly, the original tubular sheath is shortened in appropriate amount to be received between couplings 15 and 67. In general, other than for the junction formed at pipe coupling 67, the kit embodiment of FIG. 6 is analogous to the embodiment described in connection with FIGS. 1-3. Also provided in the kit is a bracket 45 which is readily attached to the pre-existing holder by means of U-bolt 56, strap 51 and nuts 55.

Withdrawing a wand-type spray gun having a detent mechanism of the instant invention associated therewith does not require conscientious effort on the part of the user. The user grasps hand grip 25 and urges the spray gun rearwardly in accordance with conventional practice. During initial rearward movement, spring 39 is compressed and the mechanism achieves the configuration as illustrated in FIG. 7. Ring-like member 30 is not free to move, being engaged with lip 61. Circumferential edge 73 at the rearward end 37 of collar 34 provides a fulcrum for ring-like member 30, which rocks to an angular position, rendering ineffective the interlock between lip 61 and ring-like member 30. In response to continued rearward force applied by the user, ring-like member 30 slides upwardly and rearward over lip 61, freeing the spray gun from the holder. In actual practice, the user can withdraw the spray gun from the holder with a continuous movement which is substantially uninterupted by a detent mechanism of the instant invention. Subsequent to the release of ring-like member 30 from lip 61, coil spring 39 expands, urging the components into the configuration as illustrated in FIG. 3, preparatory to reinsertion of the spray gun into the holder.

Various modifications and variations to the embodiments herein chosen for purposes of illustration will readily occur to those skilled in the art. To the extent that such modifications and variations do not depart from the spirit of the invention, they are intended to be included within the scope thereof, which is limited only by a fair assessment of the appended claims.

Having fully described and disclosed the present invention and alternately preferred embodiments thereof in such clear and concise terms as to enable those skilled in the art to understand and practice the same, the invention claimed is:

1. In a wand type spray gun assembly for delivery and directing pressurized fluid, which assembly includes:
    a spray gun including,
        an elongate fluid conducting barrel having a rearward end with a fluid inlet and a forward end,
        a spray nozzle carried at the forward end of said barrel,
        a handle carried to the rearward end of said barrel, and
    a holder including
        an elongate tube sized to receive said barrel therein and having a forward end and a rearward end, and
        means for supporting said holder in an inclined position with the forward end lower than the rearward end, a detent mechanism for retaining said spray gun in said holder against force urging said spray gun rearwardly in response to emission of said pressurized fluid from said nozzle and for releasing said spray gun from said holder in response to rearwardly directed force applied to said handle, said detent mechanism comprising:
  (a) a collar slidably disposed upon said barrel nearer the rearward end than the forward end thereof;
  (b) biasing means normally urging said collar rearwardly;
  (c) stop means for limiting the rearward movement of said collar;
  (d) a ring-like member slidably disposed upon said barrel intermediate said collar and said stop means, said ring-like member sized to be received within said tube; and
  (e) a lip carried proximate the rearward end of said tube and extending inwardly to receive said ring-like member thereagainst in response to rearward movement of said spray gun.

2. The detent mechanism of claim 1, wherein said stop means includes an annular shoulder extending radially from said barrel.

3. The detent mechanism of claim 2, wherein said annular shoulder is carried by a sleeve slidably disposed upon said barrel and having limited movement in a rearward direction.

4. The detent mechanism of claim 1, wherein said ring-like member is angularly movable in a rocking motion relative said barrel.

5. The detent mechanism of claim 4, further including an annular edge on said collar which functions as a fulcrum for rocking motion of said ring-like member as said spray gun is urged rearwardly with said ring-like member bearing against said lip.

6. The detent mechanism of claim 1, wherein said biasing means comprises a compression spring coiled about said barrel.

7. The detent mechanism of claim 6, further including a counterbore within said collar for receiving said compression spring therein.

8. The detent mechanism of claim 1, further including a ramp depending downwardly rearward from said lip for guiding said spray gun into said holder.

9. The detent mechanism of claim 1, further including guide means carried by said collar for directing said spray gun into said holder in reponse to forwardly directed pressure exerted upon said spray gun.

10. The detent mechanism of claim 9, wherein said guide means includes a fin extending radially from said collar and having an outer edge directed outwardly rearward from said barrel.

* * * * *